United States Patent
Widdup et al.

(10) Patent No.: US 7,685,493 B2
(45) Date of Patent: Mar. 23, 2010

(54) BUFFER COMPRESSION IN AUTOMATIC RETRANSMISSION REQUEST (ARQ) SYSTEMS

(75) Inventors: Benjamin John Widdup, Glenwood (AU); Koen van den Beld, Rouse Hill (AU)

(73) Assignee: Agere Systems Inc., Allentown, PA (US)

( * ) Notice: Subject to any disclaimer, the term of this patent is extended or adjusted under 35 U.S.C. 154(b) by 845 days.

(21) Appl. No.: 11/540,794

(22) Filed: Sep. 29, 2006

(65) Prior Publication Data

US 2008/0092008 A1   Apr. 17, 2008

(51) Int. Cl.
 *H04L 1/16* (2006.01)
(52) U.S. Cl. ...................................... 714/751
(58) Field of Classification Search .................. 714/751
 See application file for complete search history.

(56) References Cited

U.S. PATENT DOCUMENTS

| | | | | |
|---|---|---|---|---|
| 5,276,764 A | * | 1/1994 | Dent | 704/200 |
| 5,838,267 A | * | 11/1998 | Wang et al. | 341/94 |
| 5,926,786 A | * | 7/1999 | McDonough et al. | 704/224 |
| 6,212,207 B1 | * | 4/2001 | Nicholas | 370/523 |
| 6,263,017 B1 | * | 7/2001 | Miller | 375/222 |
| 6,343,151 B1 | * | 1/2002 | King | 382/236 |
| 6,571,212 B1 | * | 5/2003 | Dent | 704/270.1 |
| 7,165,204 B2 | * | 1/2007 | Cudak et al. | 714/751 |
| 2005/0163256 A1 | * | 7/2005 | Kroeger | 375/300 |

* cited by examiner

*Primary Examiner*—Stephen M Baker
(74) *Attorney, Agent, or Firm*—Mendelsohn, Drucker & Associates, P.C.

(57) ABSTRACT

A method and system for improving buffer compression in automatic retransmission request (ARQ) systems includes both a compander and decompander for further processing data. A received data string k bits in length is first companded according to a predetermined companding scheme. The companded data string is reduced to a length of k−1 bits for more efficient storage. Upon receipt of a request for retransmission, the stored companded data string is loaded and decompanded back to a length of k bits. Once decompanded, the data string is combined with a retransmitted data string to produce a single data string with an increased likelihood of being correct. By companding the data string before storage, a smaller memory block can be used for the storage of the data string.

28 Claims, 4 Drawing Sheets

Figure 4

| Original (5 bits) | Companded (4 bits) | Decompanded (5 bits) |
|---|---|---|
| -16 (& beyond) | -8 | -15 |
| -15 | | |
| -14 | -7 | -12 |
| -13 | | |
| -12 | | |
| -11 | -6 | -9 |
| -10 | | |
| -9 | | |
| -8 | -5 | -6 |
| -7 | | |
| -6 | | |
| -5 | -4 | -4 |
| -4 | | |
| -3 | -3 | -3 |
| -2 | -2 | -2 |
| -1 | -1 | -1 |
| 0 | 0 | 0 |
| 1 | 1 | 1 |
| 2 | 2 | 2 |
| 3 | 3 | 3 |
| 4 | 4 | 4 |
| 5 | | |
| 6 | 5 | 6 |
| 7 | | |
| 8 | | |
| 9 | 6 | 9 |
| 10 | | |
| 11 | | |
| 12 | 7 | 13 |
| 13 | | |
| 14 | | |
| 15 (& beyond) | | |

BUFFER COMPRESSION IN AUTOMATIC RETRANSMISSION REQUEST (ARQ) SYSTEMS

FIELD OF THE INVENTION

The present invention pertains to Automatic Retransmission Request systems.

BACKGROUND OF THE INVENTION

Automatic Retransmission requests (ARQs) are utilized in numerous applications, especially in the field of telecommunications. Generally, designs using ARQs store transmitted data strings temporarily in memory for use in the event that a retransmission request is received (i.e., when a decoder fails to correctly decode the received data string), creating a temporary buffer of transmitted data. If a retransmission request is received, a data string is re-transmitted. Once the retransmitted data string is received, the decoder attempts once again to decode the string. Only when a decoder successfully decodes a string will the next data string be received.

Prior art designs using ARQ utilize a "stop-and-wait" functionality. Once a transmission is sent, the transmitted data string is held in a buffer (or small memory block) in the transmitter until either an acknowledgement (ACK) or not-acknowledgement (NACK) signal is received from the decoder. If an ACK is received, the next string of data is sent to the recipient. If a NACK is received, a retransmission request is sent to the original transmitter.

In order to overcome delays between reception of a block and its retransmission (which can be due to processing latencies, e.g., decode and transmission of an acknowledgement/not-acknowledgement (ACK/NACK) signal), many implementations, including the well known 3GPP standards, support multiple, or parallel, stop-and-wait ARQ processes. 3GPP (the 3rd Generation Partnership Project) is a collaboration agreement established in December 1998 that brought together a number of telecommunications standards and described several standards for use with systems employing ARQ. One such standard is the parallel stop-and-wait ARQ process. Parallel stop-and-wait processes have the effect of increasing the throughput by utilizing what would otherwise be dead time between transmission of the data and reception of the ACK/NACK signal. Essentially, a parallel stop-and-wait ARQ process utilizes multiple stop-and-wait processes running simultaneously. Once a first data string is sent, additional data strings are sent until the ACK/NACK is received for the first string. If a NACK is received, the first data string is loaded from memory and retransmitted. If an ACK is received, the new data string is received that overwrites the first data string in memory.

Unfortunately, when parallel stop-and-wait ARQ processes are used, the receiver must store up to n strings of data, where n is the number of parallel ARQ processes that can be supported, requiring a significant amount of additional memory (which increases the cost of the receiver). Compared to a single stop-and-wait process, a parallel stop-and-wait process requires a memory block n times larger.

Any communication system implementing a stop-and-wait ARQ process, whether single or parallel, has large memory requirements for storage of received data between retransmissions, which consumes significant chip area. While systems using single stop-and-wait ARQ systems do not require as large a memory block as those using parallel ARQ, they inefficiently use the transmission channel and, subsequently, processing time is lost as only one data transmission is processed at a time.

Improvements in system performance can be achieved by performing "chase combining" in the receiver. Chase combining is the combining of a transmission and its subsequent retransmissions in the receiver and passing the combined transmissions to the decoder. This achieves improved performance because the combination of multiple transmissions is more accurate than any of the single transmissions on their own. Chase combining, however, requires significant memory as the receiver must store soft information (usually in the form of log-likelihood ratios) rather than hard samples such that samples between transmissions can be combined with an appropriate weight. In ARQ systems employing chase combining, a receiver converts each bit of a received transmission to a log-likelihood ratio (LLR) bit (i.e., a soft sample of the data string). Each conversion is based upon the likelihood of that bit having been transmitted correctly. Once the transmitted data string is converted, the data string is then stored in memory. Once a retransmission request is received, the stored data string is loaded and combined with the re-received data string. Since the stored data string has been converted to an LLR, each bit is weighted appropriately based upon the likelihood of it having been correct when originally received.

One of the standards of 3GPP describes an implementation of a variant of ARQ known as hybrid-ARQ or HARQ. A major difference between a traditional stop-and-wait ARQ and HARQ is that in HARQ a different subset of coded data may be sent on each transmission, and subsequent retransmission. Sending different subsets of the coded data on retransmissions is also known as incremental redundancy. In HARQ, a data string is encoded along with an error correction code. HARQ results in better performance but increases the implementation complexity. Whether traditional ARQ or HARQ is implemented, received data strings should be stored between transmissions such that if a transmission failure occurs a stored data string can be combined with the next transmission of a data string to improve the probability of making a successful decode.

State of the art technology utilizing parallel stop-and-wait ARQ and chase combining, together with the HARQ variation, leads to superior system performance, but requires a very large memory in the receiver (many-times larger than the number of bits in a single transmission).

What is needed is a way to reduce the size of the onboard memory utilized in an ARQ system, thereby resulting in reduced silicon cost and reduced power consumption, particularly for battery powered consumer devices such as cellular telephones.

SUMMARY OF THE INVENTION

The present invention implements an improved system where data to be stored in an ARQ is compressed to a smaller string of bits to reduce the size of the required memory. Upon the reception of a retransmission, the compressed stored data is expanded back to its original number of bits for combining with a retransmission of the data string and sending to a decoder for further processing. By combining the expanded data with retransmitted data from the original sender, the system results in minimal performance degradation compared to a system without compression, yet provides significant cost savings.

The compression and expansion of the data is performed at a compander and a decompander. In existing ARQ designs, once a data string (k bits) is received, all k bits are stored in the ARQ memory. In the present invention, the received data string is first compressed at a compander. A compander is a "lossy" compression circuit that compresses a data string according to a predetermined set of rules. In one embodiment of the present invention, the compander compresses the data word to a size of k−1 bits. This compressed data is then stored in the memory block. Due to the compression, however, a smaller memory block is can be used. The savings in memory size is 1/k times the original memory size.

Once a retransmission is received, the companded stored data is loaded from memory, and expanded at the decompander. Similar in function to the compander, the decompander expands a data string according to a predetermined set of rules. In one embodiment of the present invention, the decompander expands the stored data string from k−1 bits to the original length of k bits. However, some data integrity loss can occur during this step. To account for this loss, the expanded stored data is combined with a retransmission from the original sender of the data at full (k bits) precision to improve the accuracy of the retransmission. After the stored data is combined with the retransmitted data from the original sender, the data is clamped (or reduced in size back to k bits, as during the combining step the result may be larger than k bits) and sent to the recipient. The newly processed data replaces the old data string in the ARQ memory in the event that a new retransmission request is received from the recipient.

BRIEF DESCRIPTION OF THE FIGURES

FIG. 4 is a table showing a companding/decompanding scheme in accordance with the present invention.

DETAILED DESCRIPTION OF THE INVENTION

The present invention provides a system using automatic retransmission requests (ARQs) that utilizes a companding/decompanding scheme to reduce the size of onboard memory required to store received data strings. This improves over the known prior art where a larger memory must be used to store received data strings.

Figure 1:
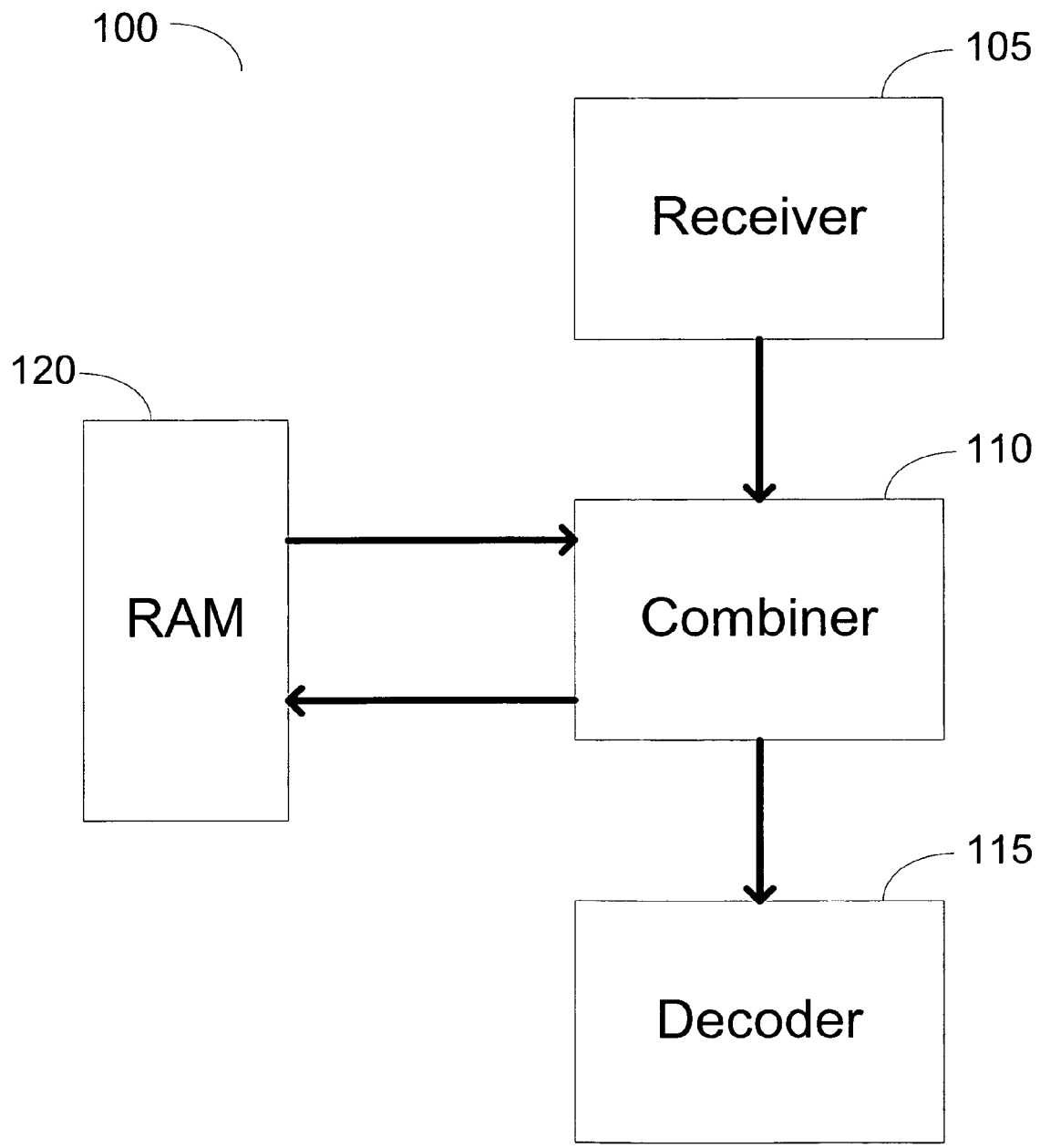
FIG. 1 is a diagram of an automatic retransmission request (ARQ) system.

FIG. 1 illustrates a typical ARQ system utilizing chase combining. Receiver 105 initially receives an incoming data string. Upon first reception of a data string, the received data string is sent to combiner 110 which forwards an unchanged copy of the block to memory 120 and another unchanged copy to the decoder 115. In prior art chase combining ARQ systems, the stored data string is stored as a log likelihood ratio such that received data can be combined with an appropriate weight should a retransmission be received. Utilizing a standard error-detection code, decoder 115 can detect whether the received data contains transmission errors, and whether these transmission errors can be corrected. If the errors cannot be corrected, decoder 115 requests a retransmission of the data. Receiver 105 then receives the retransmitted data string and sends this retransmitted data string to combiner 110. Here, combiner 110 retrieves the stored data string and combines the stored data string with the retransmitted data string. The combined results are forwarded to decoder 115 for further processing. A copy of the combined results is stored in memory block 120 should another transmission be required. By combining the stored data string with the retransmitted data string, the likelihood of a correct data string being passed to the decoder is increased. The retransmission/combining/decoding process may be repeated until the data is successfully received.

Figure 2:
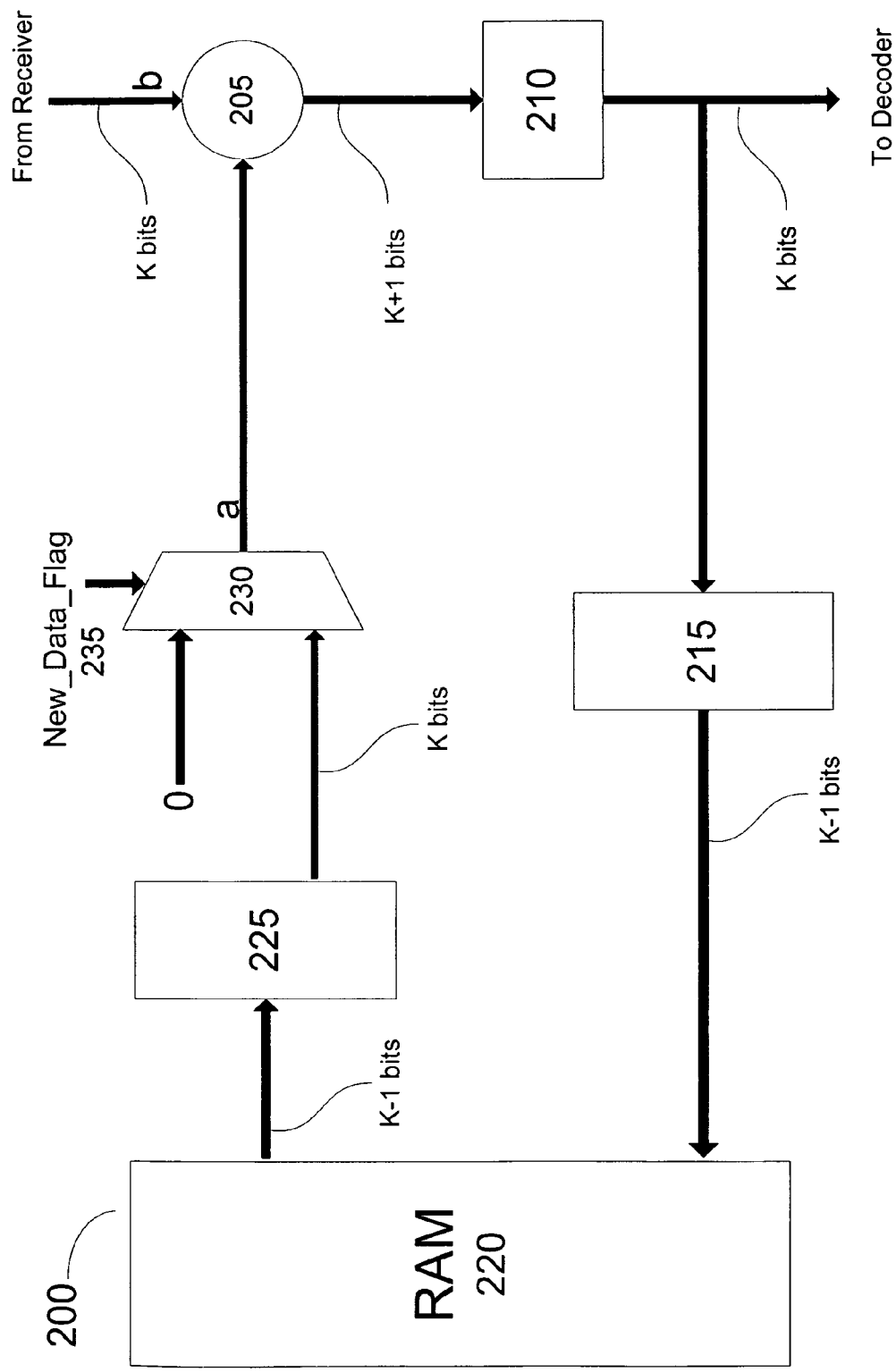
FIG. 2 is a diagram of the data path between the receiver and the decoder of an ARQ in accordance with the present invention.

FIG. 2 shows ARQ subsystem 200 utilizing principles of the present invention and in particular those parts of an ARQ system that are modified by the present invention.

ARQ subsystem 200 receives a data string from a receiver, along with a value for New_Data_Flag 235. New_Data_Flag 235 is used as a selection input for multiplexer 230. When a new data string is received, New_Data_Flag 235 is set to a value of one. The received data string from the receiver, as well as the output of multiplexer 230, are combined at combiner 205. In this case, when New_Data_Flag 235 is set to one (i.e., new data is received), the output of multiplexer 230 is forced to zero. The data string from the receiver is k bits in length, as is the data string from the output of multiplexer 230. Combining two data strings of length k results in a data string with length k+1 bits. However, in this example, as one of the combined strings was forced to zero, the value of the received data string remains unchanged.

This combined data string is passed to and clamped by clamp 210, which acts a limiter in the circuit, reducing the length of the data string to k bits. The clamped data string is passed to a decoder, as well as to compander 215. A compander is a compression circuit that compresses a data string according to a predetermined set of rules. In the present invention, the compander compresses the data string from k bits to a length of k−1 bits. This compressed block is then stored in memory 220.

When a retransmission request is received (i.e., when New_ Data_Flag 235 is zero), an appropriate data string is loaded from memory 220. The loaded data string is passed to decompander 225, which acts conversely to the compander. Decompander 225 expands a data string according to a predetermined set of rules. In this example, decompander 225 decompands the loaded data string to its original length of k bits. Once the data string is decompanded to a length of k bits, the data string is passed to multiplexer 230. Here, since New_ Data_Flag 235 is set to zero, the decompanded data string is passed by multiplexer 220 to the combiner. Similar to above, the data string is combined and clamped, and simultaneously passed to the decoder and the compander. The process used for receiving a transmission, as well as a retransmission request, is further explained in the discussion of FIG. 3.

Figure 3:
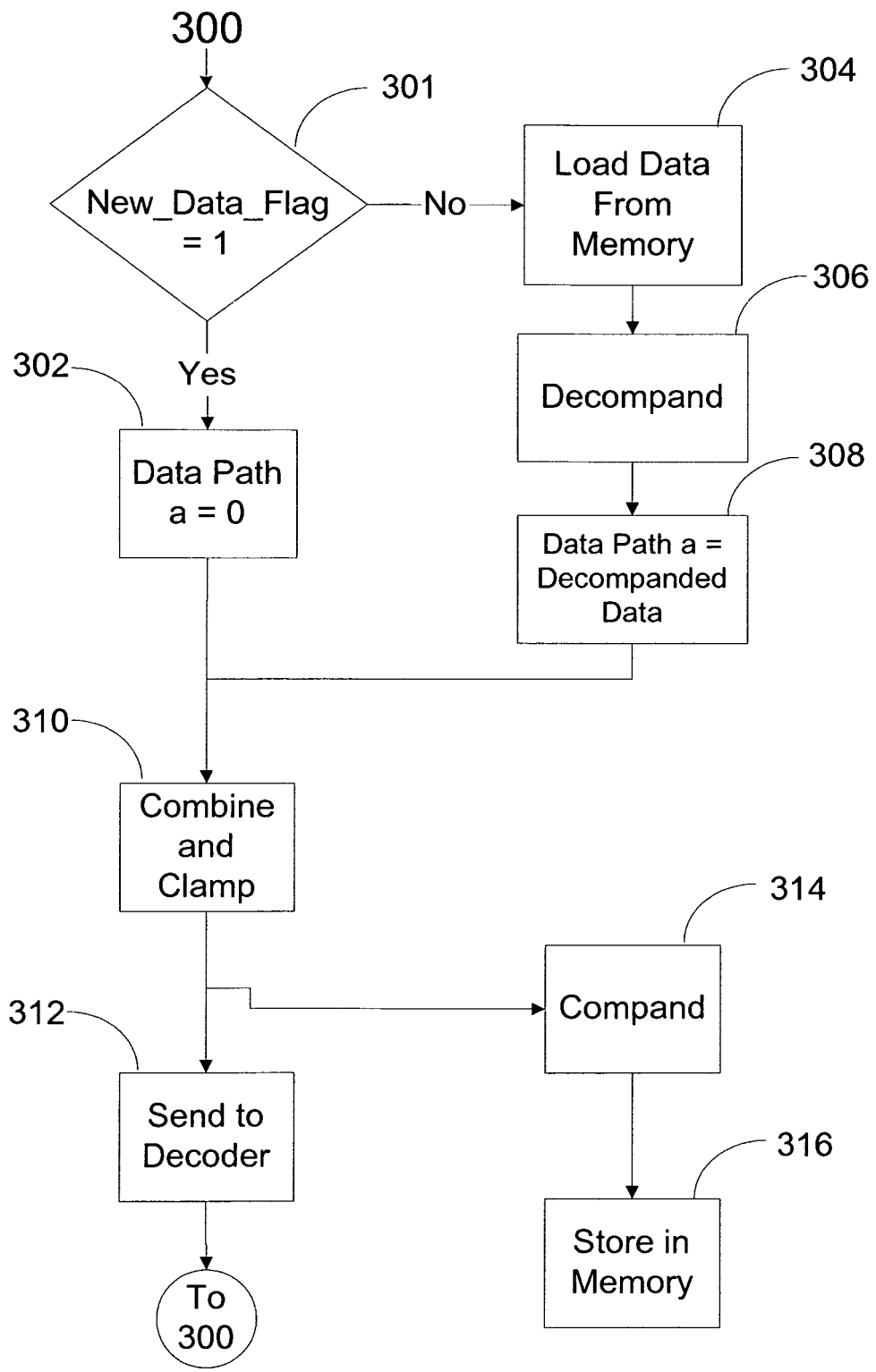
FIG. 3 is a flow chart illustrating one embodiment of the present invention.

FIG. 3 illustrates a flow chart of a data string progressing through the ARQ system of FIG. 2. The process begins at 300. Here, a data string has been received from the receiver. At step 301, the value of New_Data_Flag 235 is checked. When the data string is part of a new transmission, New_Data_Flag 235 will be set to 1 and the process will continue to step 302. Here, data path a in FIG. 1 will be set to zero as the zero input on multiplexer 230 will be selected. The process continues to step 310. At step 310, the two data paths a and b will be combined at combiner 205. Data path a is set to zero, and data path b is the data string from the receiver. As explained above, when the two data strings are combined, the resulting data string will be a length of k+1 bits. The resulting data string from the combining step is clamped to k bits. The process proceeds to simultaneously to steps 312 and 314. At step 312, the combined and clamped data string is passed to the decoder and the process returns to 300. At step 314, which occurs simultaneously to step 312, the combined and clamped data string is companded at compander 215. Compander 215 compands the combined and clamped data string to a length of k−1 bits and stores the companded data string in memory 220 for later access.

Once the process returns to step 300, the above situation repeats until a retransmission request is received. When a retransmission request is received, at step 301, New_Data_Flag 235 will be set to zero, which indicates the decoder has requested a retransmission and the receiver has received the retransmitted data string. The process continues now to step 304 where the previously transmitted data string is loaded from memory. Once loaded, the data string is passed to decompander 225. Here, the loaded data string is decompanded to a length of k bits. At step 308, multiplexer 230 passes the decompanded data string on data path a to combiner 205 where it is combined with the received data. After this step, the process continues through steps 310-316 as listed above. As before, data paths a and b are combined, however when a retransmission request is received, data path a is set to the decompanded data string loaded from memory. The decompanded data string is combined with the retransmitted data on data path b, and the resulting string is clamped. The clamped string is then passed to the decoder and the compander, and after companding is stored in memory in the event that a new retransmission request is sent by the decoder. After storing in memory and sending the clamped data string to the decoder, the process once again returns to 300. Once the decoder has indicated a successful receipt of a data clock, the corresponding data block stored in memory is deleted.

FIG. 4 shows a sample companding/decompanding scheme according to principles of the present invention. This sample companding/decompanding scheme can be applied to the circuit of FIG. 2 and the process of FIG. 3. All data strings are companded before being written into memory 220, and all data strings loaded from memory 220 are decompanded before passing through multiplexer 230 and then being combined at combiner 205.

In the table of FIG. 4, a scheme is shown for a five bit data string. The leftmost column represents the original data string, ranging in value from −16 to 15. Each original data string is companded to a select value that is four bits long. For example, if the original data string is 00011 in binary (or 3 in decimal), then the companded data string will be 0011 in binary (still 3 in decimal). This four bit data string will then be stored in memory. When the data string is loaded from memory, the data string 0011 is passed to the decompander. The decompander, following the scheme presented in FIG. 3, decompands the data string 0011 to 00011. This five digit string is then passed through the multiplexer to the combiner where it is combined with the original data string re-received from the receiver.

Additionally, a group of numbers can be companded to the same value. For example, if the received data string is 01001, 01010, or 01011 in binary (decimal values 9, 10 or 11), the string will be companded to one common string, in this example 0110 (or decimal value 6). This companded string will be passed to the memory as before, and loaded when needed. When loaded and passed to the decompander, the data string 0110 will be decompanded to 01001 (or decimal value 9). This type of scheme is referred to as a "lossy" scheme, as several values lose precision when going through the companding/decompanding process. In this example, the closer a number is to zero the more precise the number should be when companded/decompanded. This is due to ARQ systems using log-likelihood ratios (LLRs) for storage of data strings, and being in the log domain, the precision requirements on low valued LLRs (closer to zero) are higher than that required on the high valued LLRs. System performance loss is therefore minimized when a companding scheme similar to that shown in FIG. 4 is used. As shown in the table in FIG. 4, the numbers closest to zero lose no precision during the companding/decompanding process.

In this example, by companding from five bits to four bits before storing the data in memory, a smaller memory block can be used. This is advantageous as a physically smaller memory block can be used in the ARQ system. Additionally, the present invention can be used in other types of ARQ systems such as a system where incremental redundancy (another variant of HARQ) is used.

It should be clear to persons familiar with the related arts that the process, procedures and/or steps of the invention described herein can be performed by a programmed telecommunication device running software designed to cause the device to perform the processes, procedures and/or steps described herein. These processes, procedures and/or steps also could be performed by other forms of circuitry including, but not limited to, application-specific integrated circuits, logic circuits, and state machines. Additionally, it the companding/decompanding scheme shown in FIG. 4 is given by way of example only. It should be clear to one of ordinary skill in the art that additional variations of companding/decompanding schemes can be used; however the principles of the invention would remain the same. It should additionally be clear to one of ordinary skill in the art that multiple variations of ARQ system functionality can be utilized, such as chase combining, incremental redundancy and hybrid ARQ (HARQ) as is well known in the art.

Having thus described a particular embodiment of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A method of improving storage of transmitted data in a system employing automatic retransmission requests (ARQ), the method comprising the steps of:
    (1) receiving a data string from a receiver of an ARQ system;
    (2) companding said data string at a compander according to a predetermined companding scheme; and
    (3) storing said companded data string in a memory block.

2. The method of claim 1, wherein said data string is k bits in length and said companded data string is less than k bits in length.

3. The method of claim 2, further comprising the step of:
    (4) loading said stored companded data string from said memory block when a retransmission of said original data string occurs.

4. The method of claim 3, further comprising the step of:
    (5) decompanding said loaded companded data string at a decompander according to a predetermined decompanding scheme, and combining said decompanded data string with said original data string at a combiner.

5. The method of claim 4, wherein said decompanded data string is k bits in length.

6. The method of claim 5, wherein step (4) further comprises updating said stored companded data string stored in said memory block after combining with said received data string.

7. The method of claim 6, wherein said predetermined companding scheme and said predetermined decompanding scheme use non-linear precision techniques.

8. The method of claim 7, wherein said ARQ system is integrated into a wireless communication device.

9. The method of claim 8, wherein said ARQ system is integrated into a cellular telephone.

10. A method of implementing an improved ARQ system, the method comprising the steps of:
  (1) receiving a data string at a receiver of an ARQ system and passing said data string to a compander;
  (2) companding said received data string at said compander according to a predetermined companding scheme;
  (3) storing said companded data string in a memory block;
  (4) loading said stored companded data string from said memory block when a retransmission of said original data string occurs;
  (5) decompanding said loaded companded data string at a decompander according to a predetermined decompanding scheme, and combining said decompanded data string with said original data string at a combiner to produce a combined data string; and
  (6) passing said combined data to a decoder for further processing.

11. The method of claim 10, wherein said data string is k bits in length and said companded data string is less than k bits in length.

12. The method of claim 11, wherein said decompanded data string is k bits in length.

13. The method of claim 12, wherein step (6) further comprises updating said stored companded data string with said combined data string.

14. The method of claim 13, wherein said updating of said stored companded data string further comprises companding said combined data string prior to storing said combined data string in said memory block.

15. The method of claim 14, wherein said predetermined companding scheme and said predetermined decompanding scheme use non-linear precision techniques.

16. The method of claim 15, wherein said ARQ system is integrated into a wireless communication device.

17. The method of claim 16, wherein said ARQ system is integrated into a cellular telephone.

18. A system for implementing improved ARQ circuitry, the system comprising:
  a receiver operably programmed to receive a transmitted data string;
  a compander operably connected to said receiver, said compander programmed to compand said data string according to a predetermined companding scheme;
  a memory block operably connected to said compander, said memory block used to store said companded data string;
  a decompander operably connected to said memory block, said decompander programmed to load said stored data string and decompand said loaded data string according to a predetermined decompanding scheme;
  a combiner operably connected to said decompander and said receiver, said combiner programmed to combine said decompanded data string and a retransmission of said original data string; and
  a decoder operably connected to said combiner, said decoder programmed to receive and further process said combined data string.

19. The system of claim 18, wherein said data string is k bits in length and said companded data string is less than k bits in length.

20. The system of claim 19, wherein said decompanded data string is k bits in length.

21. The system of claim 20, wherein said memory block updates said stored data string with said combined data string.

22. The system of claim 21, wherein said predetermined companding scheme and said predetermined decompanding scheme use non-linear precision techniques.

23. The system of claim 22, wherein said ARQ circuitry is integrated into a wireless communication device.

24. The method of claim 23, wherein said ARQ circuitry is integrated into a cellular telephone.

25. The system of claim 24, wherein said system supports chase combining of retransmissions.

26. The system of claim 25, wherein said system supports incremental redundancy variant of ARQ.

27. The system of claim 26, wherein said system supports HARQ variant of ARQ.

28. An improved ARQ circuit, the circuit comprising:
  a compander, said compander programmed to receive a data string and compand said data string according to a predetermined companding scheme;
  a memory block operably connected to said compander, said memory block used to store said companded data string;
  a decompander operably connected to said memory block, said decompander programmed to load said stored data string and decompand said loaded data string according to a predetermined decompanding scheme; and
  a combiner operably connected to said decompander and said receiver, said combiner programmed to combine said decompanded data string and a retransmission of said original data string.

* * * * *